United States Patent
Bedell et al.

(10) Patent No.: US 11,588,210 B2
(45) Date of Patent: Feb. 21, 2023

(54) BATTERY-BASED NEURAL NETWORK WEIGHTS

(71) Applicant: INTERNATIONAL BUSINESS MACHINES CORPORATION, Armonk, NY (US)

(72) Inventors: Stephen W. Bedell, Wappingers Falls, NY (US); Joel P. De Souza, Putnam Valley, NY (US); Yun Seog Lee, White Plains, NY (US); Ning Li, White Plains, NY (US); Devendra K. Sadana, Pleasantville, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1508 days.

(21) Appl. No.: 15/803,937

(22) Filed: Nov. 6, 2017

(65) Prior Publication Data
US 2018/0260701 A1  Sep. 13, 2018

Related U.S. Application Data

(63) Continuation of application No. 15/452,167, filed on Mar. 7, 2017, now Pat. No. 10,943,169.

(51) Int. Cl.
*H01M 50/502* (2021.01)
*H01M 10/00* (2006.01)
*H01M 10/0525* (2010.01)

(52) U.S. Cl.
CPC ......... *H01M 50/502* (2021.01); *H01M 10/00* (2013.01); *H01M 10/0525* (2013.01)

(58) Field of Classification Search
CPC ........................... H01M 50/502; H01M 10/00
USPC ........................................................ 320/137
See application file for complete search history.

(56) References Cited

U.S. PATENT DOCUMENTS

| | | | | |
|---|---|---|---|---|
| 2008/0006923 | A1* | 1/2008 | Otremba | H01L 25/50 257/686 |
| 2012/0206977 | A1* | 8/2012 | Shibata | G11C 16/10 365/185.25 |
| 2014/0160852 | A1* | 6/2014 | Lee | H01L 27/11521 257/316 |
| 2016/0351975 | A1* | 12/2016 | Momo | H01L 27/1251 |
| 2017/0279284 | A1* | 9/2017 | Lim | H02J 7/0045 |
| 2018/0247179 | A1 | 8/2018 | Brew et al. | |
| 2018/0247181 | A1 | 8/2018 | Brew et al. | |
| 2019/0164750 | A1* | 5/2019 | Li | H01L 21/02178 |
| 2019/0165356 | A1* | 5/2019 | Li | H01L 21/7624 |
| 2020/0411760 | A1* | 12/2020 | Kurita | G11C 13/003 |
| 2022/0271135 | A1* | 8/2022 | Mizushima | H01L 29/40114 |

OTHER PUBLICATIONS

List of IBM Patents or Patent Applications Treated as Related dated Nov. 6, 2017, 2 pages.

* cited by examiner

*Primary Examiner* — Suchin Parihar
(74) *Attorney, Agent, or Firm* — Tutunjian & Bitetto, P.C.; Kristofer Haggerty

(57) ABSTRACT

Methods of forming a controllable resistive element include forming source and drain regions in a substrate. A battery stack is formed on a substrate between the source and drain regions. Respective anode and cathode electrical connections are formed to the battery stack. Respective source and drain electrical connections are formed.

16 Claims, 8 Drawing Sheets

US 11,588,210 B2

BATTERY-BASED NEURAL NETWORK WEIGHTS

BACKGROUND

Technical Field

The present invention generally relates to neural networks and, more particularly, to the use of batteries to control weights in an artificial neural network.

Description of the Related Art

An artificial neural network (ANN) is an information processing system that is inspired by biological nervous systems, such as the brain. The key element of ANNs is the structure of the information processing system, which includes a large number of highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

Referring now to FIG. 1, a generalized diagram of a neural network is shown. ANNs demonstrate an ability to derive meaning from complicated or imprecise data and can be used to extract patterns and detect trends that are too complex to be detected by humans or other computer-based systems. The structure of a neural network is known generally to have input neurons 102 that provide information to one or more "hidden" neurons 104. Connections 108 between the input neurons 102 and hidden neurons 104 are weighted and these weighted inputs are then processed by the hidden neurons 104 according to some function in the hidden neurons 104, with weighted connections 108 between the layers. There may be any number of layers of hidden neurons 104, and as well as neurons that perform different functions. There exist different neural network structures as well, such as convolutional neural network, maxout network, etc. Finally, a set of output neurons 106 accepts and processes weighted input from the last set of hidden neurons 104.

This represents a "feed-forward" computation, where information propagates from input neurons 102 to the output neurons 106. Upon completion of a feed-forward computation, the output is compared to a desired output available from training data. The error relative to the training data is then processed in "feed-back" computation, where the hidden neurons 104 and input neurons 102 receive information regarding the error propagating backward from the output neurons 106. Once the backward error propagation has been completed, weight updates are performed, with the weighted connections 108 being updated to account for the received error. This represents just one variety of ANN.

SUMMARY

A method for forming a controllable resistive element includes forming source and drain regions in a substrate. A battery stack is formed on a substrate between the source and drain regions. Respective anode and cathode electrical connections are formed to the battery stack. Respective source and drain electrical connections are formed.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention implement the weights of an artificial neural network (ANN) using batteries formed as part of the gate stack of a transistor. The batteries have a linear relationship between cell voltage and charge/discharge time (or alternatively, between voltage and stored charge) for at least part of its operational range. This property is used to precisely control the voltage state of the batteries, which in turn is used to control an effective resistance through the weight element. In addition, the resulting weights are non-volatile and have symmetric bidirectionality, where equal positive and negative pulses change the state of the battery in respective directions by equal amounts.

Figure 1:
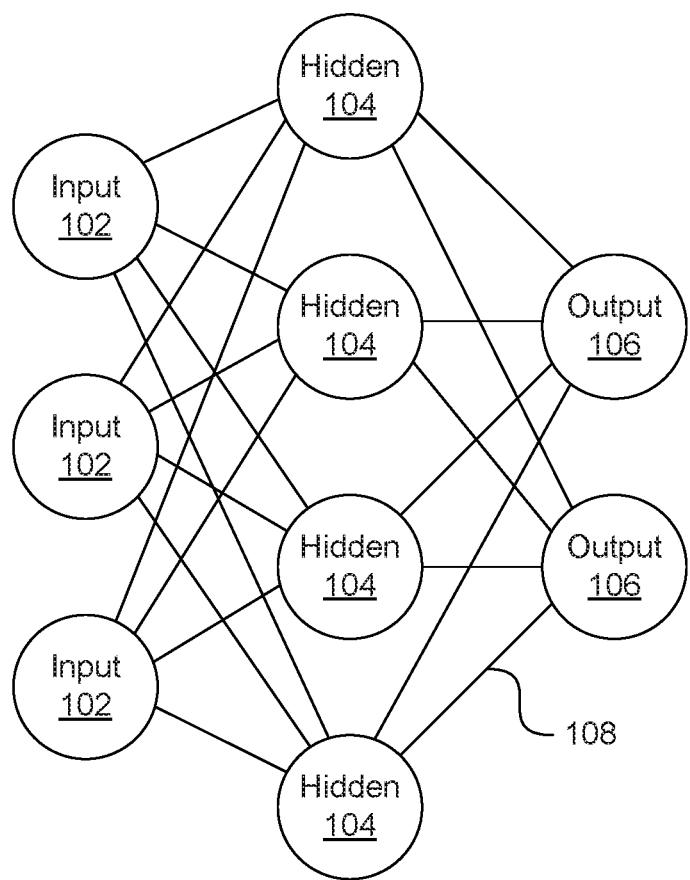
FIG. 1 is a diagram of a neural network.
Figure 2:
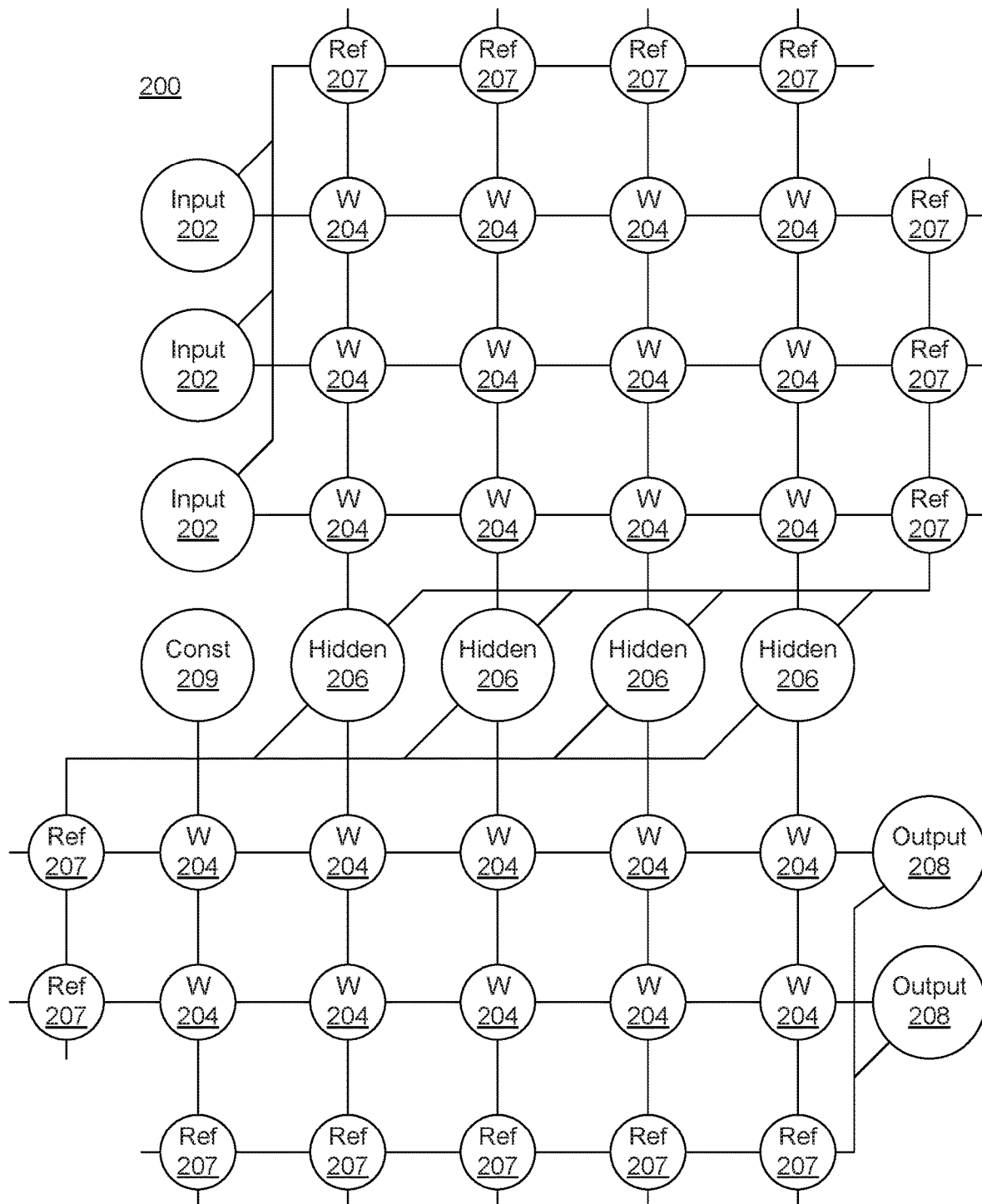
FIG. 2 is a diagram of a neural network having weights initialized to provide dedicated neurons for certain states in accordance with the present principles.

Referring now to the drawings in which like numerals represent the same or similar elements and initially to FIG. 2, an artificial neural network (ANN) architecture 200 is shown. It should be understood that the present architecture is purely exemplary and that other architectures or types of neural network may be used instead. During feed-forward operation, a set of input neurons 202 each provide an input voltage in parallel to a respective row of weights 204. The weights 204 each have a settable resistance value, such that a current output flows from the weight 204 to a respective hidden neuron 206 to represent the weighted input. The current output by a given weight is determined as $I=V/r$, where V is the input voltage from the input neuron 202 and r is the set resistance of the weight 204. The current from each weight adds column-wise and flows to a hidden neuron 206. A set of reference weights 207 have a fixed resistance and combine their outputs into a reference current that is provided to each of the hidden neurons 206. Because conductance values can only be positive numbers, some reference conductance is needed to encode both positive and negative values in the matrix. The currents produced by the weights 204 are continuously valued and positive, and therefore the reference weights 207 are used to provide a reference current, above which currents are considered to have positive values and below which currents are considered to have negative values. The reference weight 207 can also be attach outside of the array, where computation is done between an output of input layer to an input of hidden layer.

As an alternative to using the reference weights 207, another embodiment may use separate arrays of weights 204 to capture negative values. Each approach has advantages and disadvantages. Using the reference weights 207 is more efficient in chip area, but reference values need to be matched closely to one another. In contrast, the use of a separate array for negative values does not involve close matching as each value has a pair of weights to compare against. However, the negative weight matrix approach uses roughly twice the chip area as compared to the single reference weight column. In addition, the reference weight column generates a current that needs to be copied to each neuron for comparison, whereas a negative matrix array provides a reference value directly for each neuron. In the negative array embodiment, the weights 204 of both positive and negative arrays are updated, but this also increases signal-to-noise ratio as each weight value is a difference of two conductance values. The two embodiments provide identical functionality in encoding a negative value and those having ordinary skill in the art will be able to choose a suitable embodiment for the application at hand.

The hidden neurons 206 use the currents from the array of weights 204 and the reference weights 207 to perform some calculation. The hidden neurons 206 then output a voltage of their own to another array of weights 207. This array performs in the same way, with a column of weights 204 receiving a voltage from their respective hidden neuron 206 to produce a weighted current output that adds row-wise and is provided to the output neuron 208.

It should be understood that any number of these stages may be implemented, by interposing additional layers of arrays and hidden neurons 206. It should also be noted that some neurons may be constant neurons 209, which provide a constant voltage to the array. The constant neurons 209 can be present among the input neurons 202 and/or hidden neurons 206 and are only used during feed-forward operation. During back propagation, the output neurons 208 provide a voltage back across the array of weights 204. The output layer compares the generated network response to training data and computes an error. The error is applied to the array as a voltage pulse, where the height and/or duration of the pulse is modulated proportional to the error value. In this example, a row of weights 204 receives a voltage from a respective output neuron 208 in parallel and converts that voltage into a current which adds column-wise to provide an input to hidden neurons 206. The hidden neurons 206 provide combine the weighted feedback signal with a derivative of its feed-forward calculation and stores an error value before outputting a feedback signal voltage to its respective column of weights 204. This back propagation travels through the entire network 200 until all hidden neurons 206 and the input neurons 202 have stored an error value.

During weight updates, the input neurons 202 and hidden neurons 206 apply a first weight update voltage forward and the output neurons 208 and hidden neurons 206 apply a second weight update voltage backward through the network 200. The combinations of these voltages create a state change within each weight 204, causing the weight 204 to take on a new resistance value. In this manner the weights 204 can be trained to adapt the neural network 200 to errors in its processing. It should be noted that the three modes of operation, feed forward, back propagation, and weight update, do not overlap with one another.

Figure 3:
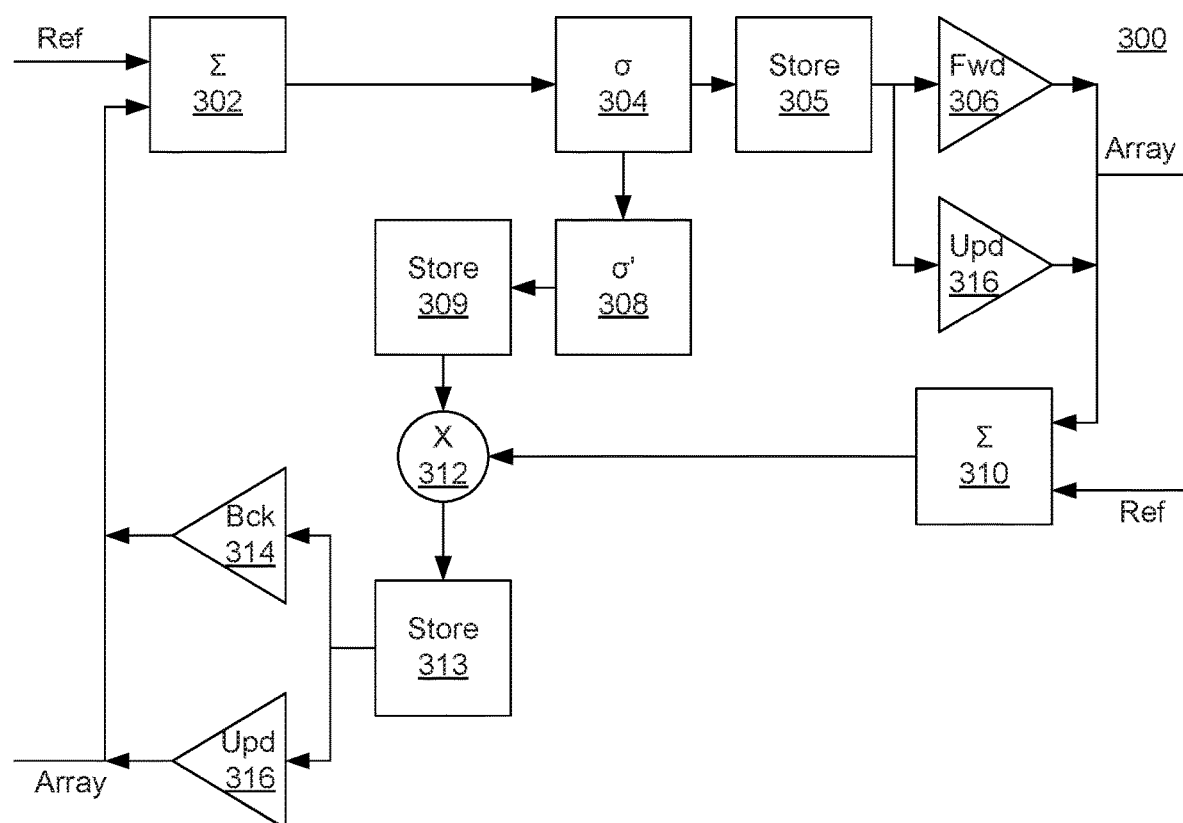
FIG. 3 is a block diagram of circuitry for reading from, writing to, and training a neural network in accordance with the present principles.

Referring now to FIG. 3, a block diagram of a neuron 300 is shown. This neuron may represent any of the input neurons 202, the hidden neurons 206, or the output neurons 208. It should be noted that FIG. 3 shows components to address all three phases of operation: feed forward, back propagation, and weight update. However, because the different phases do not overlap, there will necessarily be some form of control mechanism within in the neuron 300 to control which components are active. It should therefore be understood that there may be switches and other structures that are not shown in the neuron 300 to handle switching between modes.

In feed forward mode, a difference block 302 determines the value of the input from the array by comparing it to the reference input. This sets both a magnitude and a sign (e.g., + or −) of the input to the neuron 300 from the array. Block 304 performs a computation based on the input, the output of which is stored in storage 305. It is specifically contemplated that block 304 computes a non-linear function and may be implemented as analog or digital circuitry or may be performed in software. The value determined by the function block 304 is converted to a voltage at feed forward generator 306, which applies the voltage to the next array. The signal propagates this way by passing through multiple layers of arrays and neurons until it reaches the final output layer of neurons. The input is also applied to a derivative of the non-linear function in block 308, the output of which is stored in memory 309.

During back propagation mode, an error signal is generated. The error signal may be generated at an output neuron 208 or may be computed by a separate unit that accepts inputs from the output neurons 208 and compares the output to a correct output based on the training data. Otherwise, if the neuron 300 is a hidden neuron 206, it receives back propagating information from the array of weights 204 and compares the received information with the reference signal at difference block 310 to provide a continuously valued, signed error signal. This error signal is multiplied by the derivative of the non-linear function from the previous feed forward step stored in memory 309 using a multiplier 312, with the result being stored in the storage 313. The value determined by the multiplier 312 is converted to a backwards propagating voltage pulse proportional to the computed error at back propagation generator 314, which applies the voltage to the previous array. The error signal propagates in this way by passing through multiple layers of arrays and neurons until it reaches the input layer of neurons 202.

During weight update mode, after both forward and backward passes are completed, each weight 204 is updated proportional to the product of the signal passed through the weight during the forward and backward passes. The update signal generators 316 provide voltage pulses in both directions (though note that, for input and output neurons, only one direction will be available). The shapes and amplitudes of the pulses from update generators 316 are configured to change a state of the weights 204, such that the resistance of the weights 204 is updated.

In some embodiments, the weights 204 may be implemented in software or in hardware, using relatively complicated weighting circuitry or using resistive cross point devices. Such resistive devices may have switching characteristics that have a non-linearity that can be used for processing data. The weights 204 may belong to a class of device called a resistive processing unit (RPU) and may be used to perform calculations in the neural network 200. The RPU devices may be implemented with resistive random access memory (RRAM), phase change memory (PCM), programmable metallization cell (PMC) memory, or any other device that has non-linear resistive switching characteristics. It is particularly contemplated that the RPU devices may be implemented as voltage-controlled resistors with the voltage being set by charge stored on a battery. Such RPU devices may also be considered as memristive systems.

Figure 4:
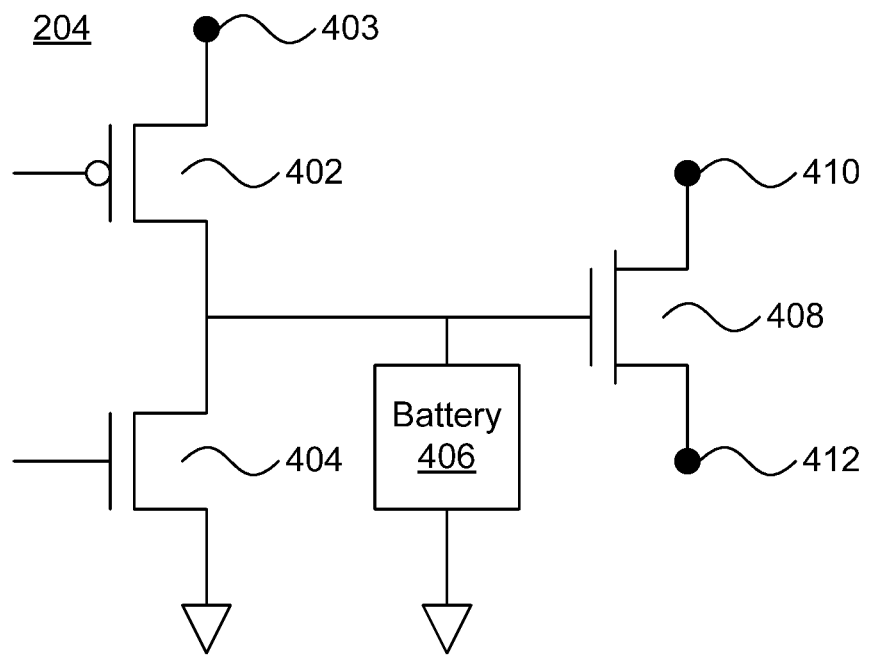
FIG. 4 is a block diagram of circuitry for providing a controllable resistance in accordance with the present principles.

Referring now to FIG. 4, a circuit schematic of a single weight 204 is shown. A write device 402 and an erase device 404 may be implemented as field effect transistors (FETs). In one embodiment, the write device 402 may be implemented as an n-type FET and the erase device 404 may be implemented as a p-type FET, though it should be understood that other configurations may be used, including using alternate types of transistor. The write device 402 can be triggered by a write signal at its gate, which causes current to flow from a current source 403, with charge being stored in battery 406. The device transistor 404 can be triggered by an erase signal at its gate, which causes current to flow from the battery 406 to ground, depleting the charge stored in the battery 406.

When the write device 402 and the erase device 404 are turned off, the charge stored at the battery 406 creates a voltage at the gate of state device 408. It is specifically contemplated that the state device 408 may be implemented as an n-type or p-type metal oxide semiconductor FET (MOSFET). The voltage applied to the gate of the state device 408 causes the state device 408 to act as a variable resistor having a resistance that is linearly determined by the amount of charge stored in the battery 406. Although a MOSFET is specifically contemplated as being a MOSFET, other types of voltage-controlled resistance devices may be used instead. As will be described in greater detail below, in some embodiments the battery 406 will be directly, structurally integrated with the gate of the state device 408.

During a read operation, when the write device 402 and the erase device 404 are turned off, a voltage is applied at an input terminal 410 of the state device 408. The current that flows at the output terminal 412 of the state device 408 is a function of the input voltage and the resistance of the state device 408. The resistance of the state device 408 (and hence of the weight 204) is controlled by the write and erase signals, with each signal increasing or decreasing the resistance of the state device by adding or removing charge to the battery 406.

Figure 5:
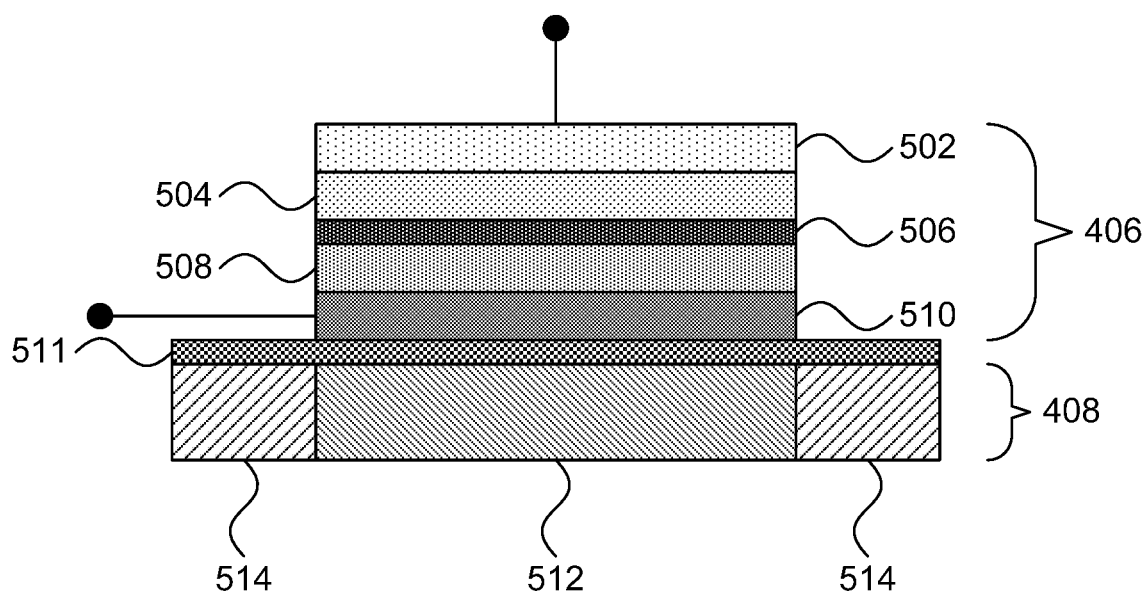
FIG. 5 is a cross-sectional diagram of a battery configured to act as a gate for a state device that provides a voltage-controlled resistance.

Referring now to FIG. 5, an exemplary battery 406 is shown. To ensure that the battery voltage stays within the linear range of the state device 408, the battery 406 should have a lowest linear operating charge that corresponds to a voltage that is higher than the threshold voltage of the state device 408. It is also possible to operate the state device 408 in its non-linear range, where the resistance value of the state device 408 is exponential as a function of battery voltage, in which case the battery 406 should have a highest linear operating charge that corresponds to a voltage that is below the threshold voltage of the state device 408. The middle point voltage of the battery 406 should be between the write voltage 403 and ground.

In one particular embodiment, the battery 406 may be a thin-film lithium ion battery that includes an anode contact 502 and an anode 504. The anode contact 502 may be formed using any appropriate conductive material including, e.g., copper, tungsten, silver, gold, platinum, titanium, tantalum, ruthenium, zirconium, cobalt, aluminum, tin, alloys thereof, graphite, graphene, carbon nanotubes, and other metallic and non-metallic conductors. The anode 504 itself may be formed from an appropriate material such as, e.g., metallic lithium to provide a high voltage range, but it should be understood that other materials such as, e.g., $Li_4Ti_5O_{12}$, $Li_xAl$, or $Li_xC,Li_xSi$ may be used instead. The anode material should have a flat discharge curve, which characterizes the voltage of the cell as the stored charge changes.

An electrolyte layer 506 separate the cathode 504 from an anode 508. It is specifically contemplated that the electrolyte layer 506 may be formed from a solid electrolyte material such as, e.g., lithium phosphorous oxy-nitride (LiPON), but alternative materials may be used instead. In other embodiments, an organic material-based electrolyte may be used in conjunction with a non-conductive separator between the cathode 504 and the anode 508. The electronic conductivity of the electrolyte layer 506 should be low to improve retention time and, hence, increase stability.

The cathode 508 may be formed from any appropriate lithium compound material such as, e.g., $LiMn_2O_4$, $LiCoO_2$, $LiV_2O_5$, $LiFePO_4$, $LiNi_xMn_yCo_z$ $V_2O_5$—$LiBO_2$, or $LiFePO_4$, with $LiMn_2O_4$ being specifically contemplated, and is in contact with a cathode contact 510. The cathode contact 510, like the anode contact 502, may be formed using any appropriate conductive material including, e.g., copper, nickel, tungsten, silver, gold, platinum, titanium, tantalum, ruthenium, zirconium, cobalt, aluminum, tin, alloys thereof, graphite, graphene, carbon nanotubes, and other metallic and non-metallic conductors. The cathode contact 510 may be formed from the same material as the anode contact 502, or the two collectors may be formed from different materials.

In addition, lithium sites near the surface of the cathode 510 have a wider potential window. Thus a nano-crystalline cathode (e.g., with a grain size below about 20 nm) provides wider voltage range control. A nano-crystalline cathode thin film can be deposited at low temperature by, e.g., sputtering at a substrate temperature of less than about half the substrate melting temperature. The thickness of the cathode 510 can be below about 100 nm for faster charging and discharging operation. It should furthermore be understood that, although the battery stack 406 is shown and described herein with the anode 502 on top and the cathode 510 near the interface with the state device 408, the orientation of the battery stack may be flipped without changing its principles of operation.

Each layer of the battery stack 406 may be formed by any appropriate deposition method including, e.g., chemical vapor deposition (CVD), physical vapor deposition (PVD), atomic layer deposition (ALD), or gas cluster ion beam (GCIB) deposition. CVD is a deposition process in which a deposited species is formed as a result of chemical reaction between gaseous reactants at greater than room temperature (e.g., from about 25° C. about 900° C.). The solid product of the reaction is deposited on the surface on which a film, coating, or layer of the solid product is to be formed. Variations of CVD processes include, but are not limited to, Atmospheric Pressure CVD (APCVD), Low Pressure CVD (LPCVD), Plasma Enhanced CVD (PECVD), and Metal-Organic CVD (MOCVD) and combinations thereof may also be employed. In alternative embodiments that use PVD, a sputtering apparatus may include direct-current diode systems, radio frequency sputtering, magnetron sputtering, or ionized metal plasma sputtering. In alternative embodiments that use ALD, chemical precursors react with the surface of a material one at a time to deposit a thin film on the surface. In alternative embodiments that use GCIB deposition, a high-pressure gas is allowed to expand in a vacuum, subsequently condensing into clusters. The clusters can be ionized and directed onto a surface, providing a highly anisotropic deposition.

Diffusivity of charges through the anode 504 into a steady state should be fast enough to support the cycle time of the neural network, such that changes made to the states of the weights 204 settle before a read operation is performed. Furthermore, charging and discharging times for a given amount of charge should be as symmetric as possible.

Although the thin-film lithium-ion battery described above can be made particularly small and is thus suitable for integrating in a hardware-based ANN, other types of batteries may be used instead. Alternative battery chemistries include potassium- or sodium-based batteries, nickel-zinc batteries, and rechargeable alkaline batteries. As long as the battery 406 supplies predictable voltages relative to the charge and discharge times supplied by the write signal and the erase signal, the battery 406 can be used to control the resistance of the state device 408 and, thus, of the weight 204.

The battery 406 is formed on state device 408, with a dielectric layer 511 being formed between them to prevent leakage of charge from the battery 406. The state device 408 can be formed from a semiconductor substrate and includes a channel region 512 and source/drain regions 514. The semiconductor substrate may be a bulk-semiconductor substrate. In one example, the bulk-semiconductor substrate may be a silicon-containing material. Illustrative examples of silicon-containing materials suitable for the bulk-semiconductor substrate include, but are not limited to, silicon, silicon germanium, silicon germanium carbide, silicon carbide, polysilicon, epitaxial silicon, amorphous silicon, and multi-layers thereof. Although silicon is the predominantly used semiconductor material in wafer fabrication, alternative semiconductor materials can be employed, such as, but not limited to, germanium, gallium arsenide, gallium nitride, cadmium telluride, and zinc selenide. Although not depicted in the present figures, the semiconductor substrate may also be a semiconductor on insulator (SOI) substrate.

The source/drain regions 512 can be formed as doped regions of the semiconductor substrate or may, alternatively, be formed from different materials that are embedded in the semiconductor substrate on either side of the channel 512. Dopants may be added to the source/drain region by implantation or by in situ doping and may be added before or after the formation of the battery stack 406. Dopants that may be used to form the source/drain regions 512 may include either p-type or n-type dopants.

As used herein, "p-type" refers to the addition of impurities to an intrinsic semiconductor that creates deficiencies of valence electrons. In a silicon-containing substrate, examples of p-type dopants, i.e., impurities, include but are not limited to: boron, aluminum, gallium and indium. As used herein, "n-type" refers to the addition of impurities that contributes free electrons to an intrinsic semiconductor. In a silicon containing substrate, examples of n-type dopants include but are not limited to antimony, arsenic and phosphorous.

As shown, electrical contact may be made to the anode contact 502 and the cathode contact 510 of the battery 406. These contacts provide the ability to add or remove charge from the battery 406, thereby controlling the voltage that the battery 406 exerts on the underling state device 408. The battery 406 thereby acts as the gate for the state device, with its voltage determining the conductivity of the channel region 512. A dielectric layer formed from, e.g., silicon dioxide or a high-k dielectric material, is formed between the cathode contact 510 and the channel region 512.

Electrical contact may also be made to the respective source and drain regions 514. To read the state of the state device 408, a voltage may be applied to the source region 514. The effective resistance of the state device 408 depends on the voltage supplied by the battery 406. The current passing through the state device 408 therefore depends on the voltage applied to the source region 514 and the effective resistance, thereby providing an output signal that can be used to determine the value of the effective resistance. This effective resistance encodes the state of the weight 204.

This relationship may be characterized by:

$$I_{ds} \approx \mu_{eff} C_{ox} \frac{W}{L} (V_{gs} - V_t) V_{ds}$$

where $I_{ds}$ is the current between source and drain regions 514, $\mu_{eff}$ is the effective mobility of the channel, $C_{ox}$ is the oxide capacitance per unit area, W is the channel width, L is the channel length, $V_{gs}$ is the gate-source voltage of the state device 408, $V_t$ is the threshold voltage of the state device 408, and $V_{ds}$ is the drain-source voltage of the state device 408.

While only one battery structure is shown herein, it should be understood that the battery structure may be repeated multiple times, with multiple batteries being stacked on top of one another to increase battery capacity and, therefore, the voltage range that the battery stack 406 can exert. In this way, multiple battery cells can be arranged in serial.

Figure 9:
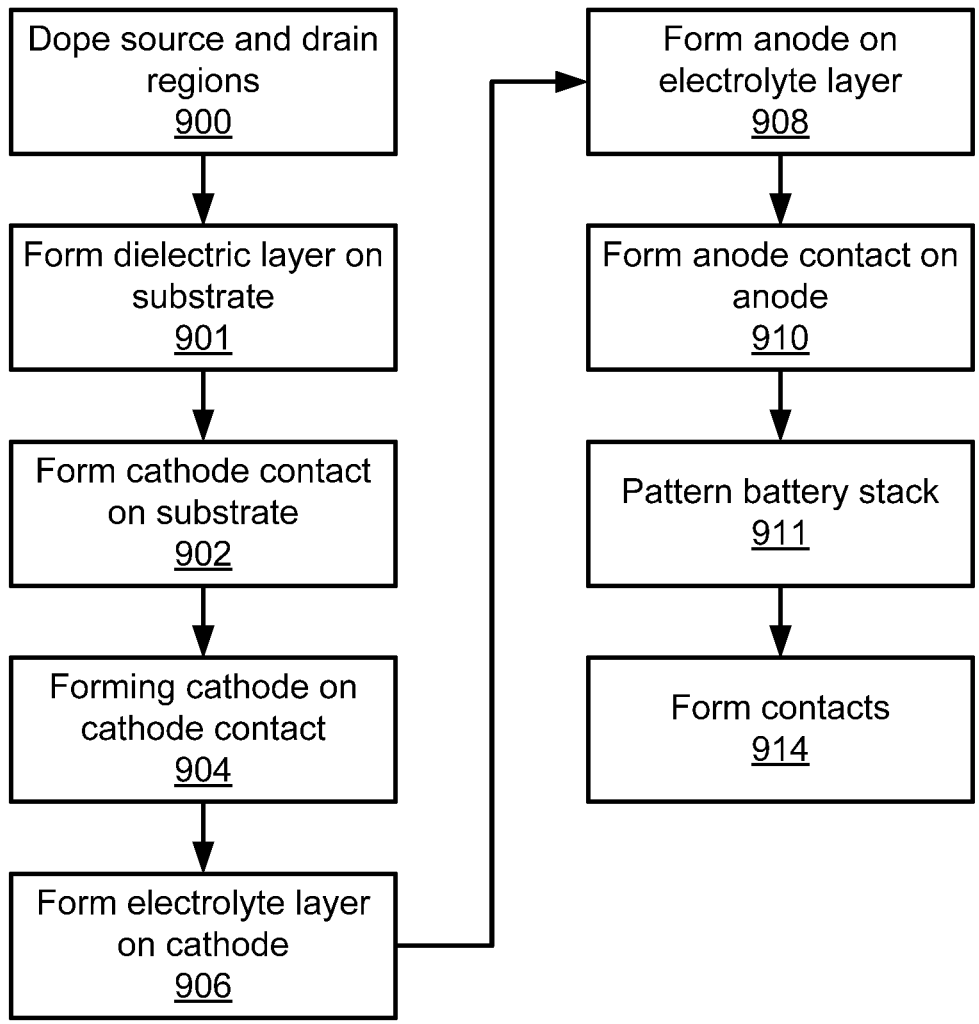
FIG. 9 is a block/flow diagram of a method of forming a battery stack that is configured to act as a gate for a state device that provides a voltage-controlled resistance.

Referring now to FIG. 9, a method of forming a battery 406 and state device 408 is shown. Block 900 dopes source and drain regions 514 of a substrate with any appropriate dopant by, e.g., dopant implantation. The channel region 512 may be masked by any appropriate masking material or process. In an alternative embodiment, the semiconductor substrate may be etched in the source and drain regions 514 and new source/drain structures may be deposited or epitaxially grown and in situ doped.

Block 901 forms a dielectric layer 511 on a substrate, over the channel region 512 and the source/drain regions 514. Block 902 forms a cathode contact 510 on the dielectric layer 511. The dielectric layer 511 and cathode contact 510 may be formed by any appropriate deposition process including, e.g., CVD, PVD, or ALD. Block 904 then deposits the cathode 508 on the cathode contact by any appropriate deposition process.

An electrolyte layer 506 is formed on the cathode 508 in block 906. As noted above, the electrolyte layer 506 is specifically contemplated as being a solid electrolyte that may be deposited by any appropriate process. In alternative embodiments, the electrolyte layer 506 may be formed using a non-conductive separator and a liquid electrolyte solution.

Block 908 forms the anode 504 on the electrolyte layer 506 and block 910 forms the anode contact 502 on the anode 504. The stack of materials is then patterned to form the battery stack 406 in block 911. The battery stack 406 is patterned such that the region of the substrate directly under the battery stack 406 is the channel region 512 of the state device 408. This patterning process may include, e.g., photolithographic masking and an anisotropic etch such as, e.g., reactive ion etching (RIE). RIE is a form of plasma etching in which during etching the surface to be etched is placed on the RF powered electrode. Moreover, during RIE the surface to be etched takes on a potential that accelerates the etching species extracted from plasma toward the surface, in which the chemical etching reaction is taking place in the direction normal to the surface. Other examples of anisotropic etching that can be used at this point of the present invention include ion beam etching, plasma etching or laser ablation.

Block 914 forms electrical contacts to the battery stack 406 and to the state device 408. In particular, connections are made to the anode contact 502 and the cathode contact 510 to facilitate changing the state of the battery 406. Connections are also made to the respective source and drain regions 514 to facilitate reading the resistance of the state device 408 as set by the battery voltage.

It is to be understood that aspects of the present invention will be described in terms of a given illustrative architecture; however, other architectures, structures, substrate materials and process features and steps can be varied within the scope of aspects of the present invention.

It will also be understood that when an element such as a layer, region or substrate is referred to as being "on" or "over" another element, it can be directly on the other element or intervening elements can also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

The present embodiments can include a design for an integrated circuit chip, which can be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer can transmit the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

Methods as described herein can be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

It should also be understood that material compounds will be described in terms of listed elements, e.g., SiGe. These compounds include different proportions of the elements within the compound, e.g., SiGe includes $Si_xGe_{1-x}$ where x is less than or equal to 1, etc. In addition, other elements can be included in the compound and still function in accordance with the present principles. The compounds with additional elements will be referred to herein as alloys.

Figure 6:
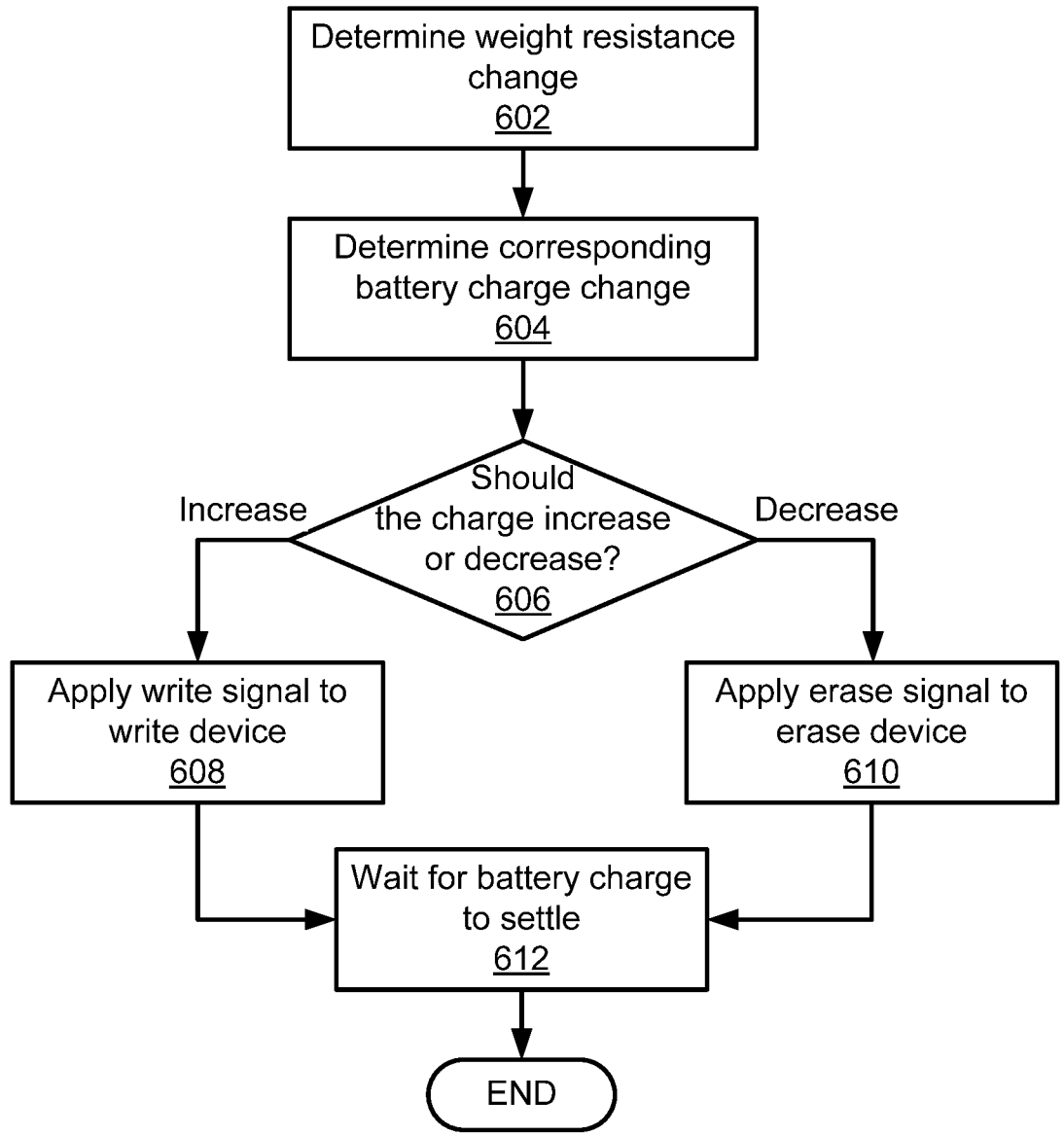
FIG. 6 is block/flow diagram of a method for changing a weight resistance in accordance with the present principles.

Referring now to FIG. 6, a method of controlling the resistance value of a weight 204 is shown. This process may be performed during training of an ANN to adjust the values of any weights 204 and to bring the output of the ANN closer to the expected trained output. Block 602 determines the weight resistance change for each weight 204 that is needed according to a difference between the ANN's output and the expected output from a training corpus. Block 604 determines how much the voltage at the state device 408 needs to change to create the target resistance and then determines how much the stored charge in the battery 406 needs to change to create the target voltage.

Block 606 determines whether the change in charge reflects an increase in the charge stored at the battery 406 or a decrease in such charge. If an increase in charge is needed, a write signal is applied to the write device 402. The write signal has a duration calculated to add the determined amount of charge to the battery 406. If a decrease in charge is needed, an erase signal is applied to the erase device 404. The erase signal has a duration calculated to permit the battery 406 to discharge the determined amount of charge to ground.

After the charge on the battery 406 has either increased or decreased, block 612 waits for the battery charge to settle. The battery 406 needs a small amount of time for the stored charges to diffuse to a steady state to produce a stable voltage. Once this time has elapsed, the weight 204 will provide the correct resistance value and can be used for ANN calculations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Figure 7:
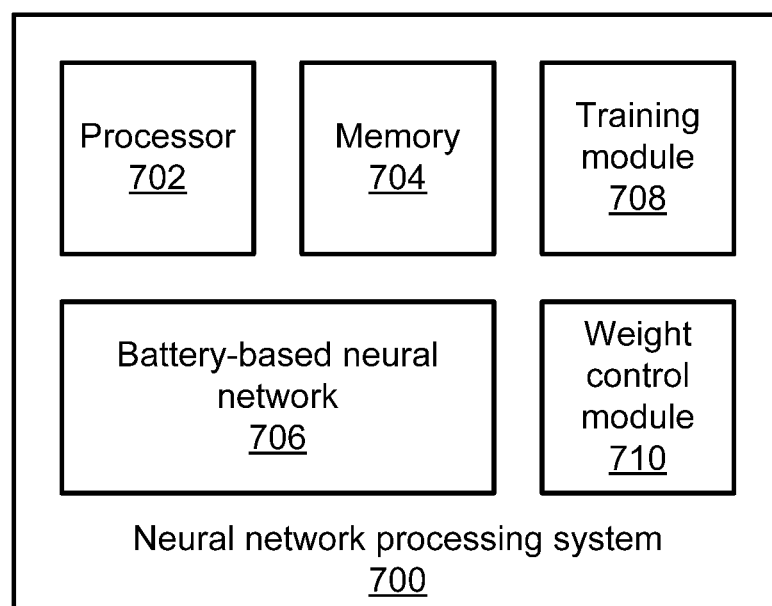
FIG. 7 is a block diagram of a neural network processing system in accordance with the present principles.

Referring now to FIG. 7, a neural network processing system 700 is shown. The neural network processing system 700 includes a hardware processor 702 and a memory 704. A battery-based neural network 706 includes a set of input neurons 202, one or more sets of hidden neurons 206, and a set of output neurons, with battery-controlled variable resistive weights 204 as described above. In addition, the neural network processing system 700 includes functional modules that may be implemented as software that is stored in memory 704 and executed by processor 702. In alternative embodiments, the functional modules may be implemented as one or more discrete hardware components in the form of, e.g., an application-specific integrated chip or field programmable gate array.

For example, a training module 708 uses training data that is stored in the memory 704 to train the battery-based neural network 706. As the training module 708 processes the training data, the training module 708 determines errors between the neural network output and the expected results. These errors are used as a basis for updates to the weights 204 of the battery-based neural network 706. A weight control module 710 alters the resistance values of the weights 204 in the battery-based neural network 706 as described above, issuing write and erase signals to the weights 204 as needed.

Figure 8:
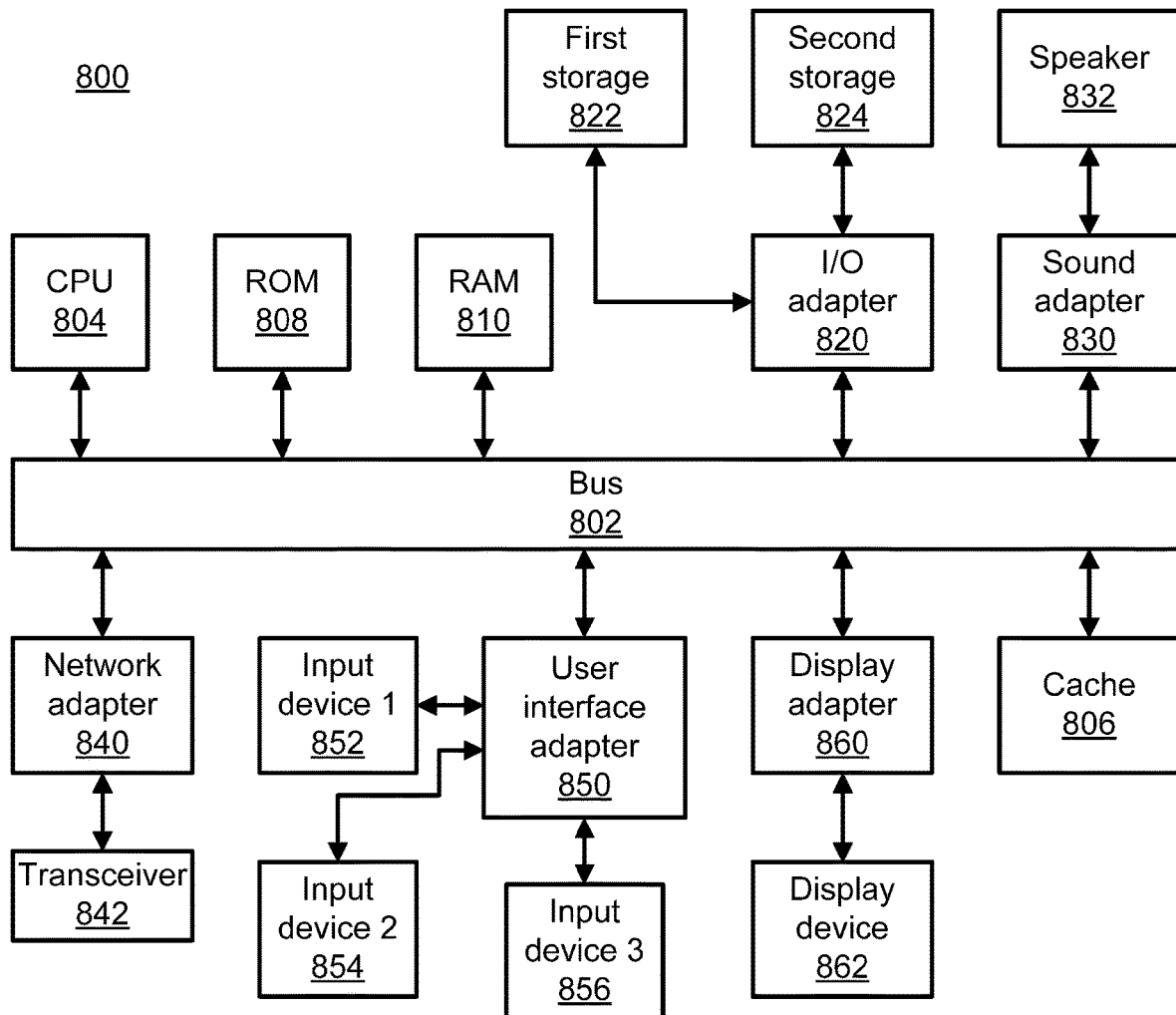
FIG. 8 is a block diagram of a processing system in accordance with the present principles.

Referring now to FIG. 8, an exemplary processing system 800 is shown which may represent elements of the neural network processing system 700. The processing system 800 includes at least one processor (CPU) 804 operatively coupled to other components via a system bus 802. A cache 806, a Read Only Memory (ROM) 808, a Random Access Memory (RAM) 810, an input/output (I/O) adapter 820, a sound adapter 830, a network adapter 840, a user interface adapter 850, and a display adapter 860, are operatively coupled to the system bus 802.

A first storage device 822 and a second storage device 824 are operatively coupled to system bus 802 by the I/O adapter 820. The storage devices 822 and 824 can be any of a disk storage device (e.g., a magnetic or optical disk storage device), a solid state magnetic device, and so forth. The storage devices 822 and 824 can be the same type of storage device or different types of storage devices.

A speaker 832 is operatively coupled to system bus 802 by the sound adapter 830. A transceiver 842 is operatively coupled to system bus 802 by network adapter 840. A display device 862 is operatively coupled to system bus 802 by display adapter 860.

A first user input device 852, a second user input device 854, and a third user input device 856 are operatively coupled to system bus 802 by user interface adapter 850. The user input devices 852, 854, and 856 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 852, 854, and 856 can be the same type of user input device or different types of user input devices. The user input devices 852, 854, and 856 are used to input and output information to and from system 800.

Of course, the processing system 800 may also include other elements (not shown), as readily contemplated by one of skill in the art, as well as omit certain elements. For example, various other input devices and/or output devices can be included in processing system 800, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 800 are readily contemplated by one of ordinary skill in the art given the teachings of the present principles provided herein.

Having described preferred embodiments of battery-based neural network weights (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims.

Having thus described aspects of the invention, with the details and particularity required by the patent laws, what is claimed and desired protected by Letters Patent is set forth in the appended claims:

1. A method for forming a controllable resistive element, comprising:
  forming source and drain regions in a substrate;
  forming dielectric layer directly on the substrate;
  forming a battery stack on the substrate between the source and drain regions after forming the dielectric layer, including forming a first battery cell that includes an anode contact layer, an anode layer, an electrolyte layer, a cathode layer, and a cathode contact layer, with one of the anode contact layer and the cathode contact layer being in direct contact with the dielectric layer;
  forming respective anode and cathode electrical connections to the battery stack; and
  forming respective source and drain electrical connections.

2. The method of claim 1, herein forming the battery stack further comprises one or more additional battery cells on the first battery cell.

3. The method of claim 1, further comprising patterning the anode contact layer, the anode layer, the electrolyte layer, the cathode layer, and the cathode contact layer to be directly above a channel region of the substrate and not directly above the source and drain regions.

4. The method of claim 1, wherein forming the source and drain regions comprises implanting dopants into the substrate.

5. The method of claim 1, wherein forming the battery stack on the substrate includes forming the battery stack directly on the dielectric layer.

6. The method of claim 1, wherein the substrate includes a semiconductor material, such that a region of the substrate under the battery stack is a channel region that changes resistance with an applied voltage.

7. The method of claim 4, wherein forming the source and drain regions further comprises masking a channel region between the source and drain regions before implanting dopants into the substrate.

8. A method for forming a processing device, comprising:
forming a plurality of controllable resistive elements on a substrate, each controllable resistive element being formed by:
  forming source and drain regions in the substrate;
  forming a dielectric layer directly on the substrate;
  forming a battery stack on the substrate between the source and drain regions after forming the dielectric layer, including forming a first battery cell that includes an anode contact layer, an anode layer, an electrolyte layer, a cathode layer, and a cathode contact layer, with one of the anode contact layer and the cathode contact layer being in direct contact with the dielectric layer;
  forming respective anode and cathode electrical connections to the battery stack; and
  forming respective source and drain electrical connections; and
connecting the plurality of controllable resistive elements to neuron devices.

9. The method of claim 8, wherein forming the battery stacks on the substrate includes forming the battery stacks directly on the dielectric layer.

10. The method of claim 9, wherein forming the battery stacks further comprises one or more additional battery cells on the first battery cell.

11. The method of claim 9, further comprising patterning the anode contact layer, the anode layer, the electrolyte layer, the cathode layer, and the cathode contact layer to be directly above a channel region of the substrate and not directly above the source and drain regions.

12. The method of claim 8, wherein forming the source and drain regions comprises implanting dopants into the substrate.

13. The method of claim 8, wherein the substrate includes a semiconductor material, such that a region of the substrate under the battery stack is a channel region that changes resistance with an applied voltage.

14. The method of claim 13, wherein forming the source and drain regions further comprises masking a channel region between the source and drain regions before implanting dopants into the substrate.

15. The method of claim 8, further comprising connecting each of the plurality of controllable resistive elements to respective control circuitry.

16. The method of claim 15, wherein the control circuitry includes a write device and an erase device.

* * * * *